United States Patent [19]

Adams

[11] Patent Number: 4,506,470

[45] Date of Patent: Mar. 26, 1985

[54] FISH HOOK

[76] Inventor: Charles C. Adams, 243 N. Avalon, Memphis, Tenn. 38112

[21] Appl. No.: 483,141

[22] Filed: Apr. 8, 1983

[51] Int. Cl.³ .............................................. A01K 83/06
[52] U.S. Cl. .................................... 43/44.8; 43/44.82
[58] Field of Search ................... 43/44.2, 44.8, 43.16, 43/42.04, 42.05, 44.87, 44.4, 44.6, 44.82

[56] References Cited

U.S. PATENT DOCUMENTS

| 715,342 | 12/1902 | Bertholf | 43/44.82 |
| 1,468,572 | 9/1923 | Maeda | 43/44.82 |
| 1,911,778 | 12/1931 | Toolan | 43/44.82 |

FOREIGN PATENT DOCUMENTS 336483 11/1903 France .................................. 43/44.8

Primary Examiner—Nicholas P. Godici
Assistant Examiner—C. McKee
Attorney, Agent, or Firm—Alan Ruderman

[57] ABSTRACT

A fish hook formed from an elongated wire having spears at each end and bent into a form such that the spears at opposite ends face toward each other and overlie the body of a lure mounted between a pair of prongs formed by bending the wire into a U-shape relative to the ends. A line attaching portion extends between the prongs spaced from the lure and includes a slip-ring slidably mounted thereon for fastening a fish line. In one embodiment the wire is a continuous member and the prongs are formed by bending the wire beneath the spears and back upon itself to form a limb at the end of the U-shape portion remote from the spears. In another form of the invention the hook may be formed from separate wire elements fused together and may include additional spears fused to the wire. A fish striking the lure or one of the spears results in a pivoting of the hook and lure about the slip-ring to impale the fish on one of the spears.

17 Claims, 2 Drawing Figures

FISH HOOK

BACKGROUND OF THE INVENTION

This invention relates to fish hooks and more particularly to a self-setting fish hook having a body portion adapted to be inserted into a lure or bait and including oppositely disposed facing spear members extending from the body portion.

The art of fishing abounds with hooks of various constructions, each with the intended purpose of securely capturing a fish on a spear when the fish strikes the hook. The multitude of proposals include hooks of various constructions having two or more spears. Exemplary of the prior art are U.S. Pat. Nos. 440,721 (Provoost); 715,342 (Bertholf); 841,951 (Evans); 914,478 (Bradley et al); 1,357,678 (Bain); 1,911,778 (Toolan); 2,618,097 (Johnstone); 2,640,291 (Garner); 2,663,966 (deMello); and 2,733,539 (Kelly).

Some of the prior art hooks, such as Provoost, Evans and Bradley et al, include structure attachable to live bait other than worms so as to entice the fish onto the spears. In Toolan the hook is supported on a slip-ring to permit shifting of a substantially S-shape hook between spears at opposite ends thereof.

However, line fishing anglers are continuously seeking improvements in hooks which would preclude a striking fish from escaping as the fish thrashes about trying to break loose. In certain of the multi-spear hooks the spears are disposed at numerous locations so that a fish going for the bait or lure would strike at least one spear, but they do not have means for precluding loss of the fish from a spear. In other hooks if the fish breaks loose from one spear, the disposition of the other spears is such as to try to have the fish caught on another spear, which generally is a low probability. In others such as in the aforesaid patents of Garner and deMello one of the spears is moveable relative to the other and comprises a construction which is relatively expensive to manufacture.

SUMMARY OF THE INVENTION

Consequently, it is a primary object of the present invention to provide a relatively inexpensive fish hook having at least two spears disposed relatively to a body portion such that a high probability of capture exists when a fish strikes one of the spears.

It is another object of the present invention to provide multi-spear hooks on a wire form having portions thereof insertable within a lure or bait, the spears being in facing relationship faced form the said portions, and the wire form being attachable to a line at a disposition spaced from the spears and from said portions.

It is a further object of the present invention to provide a multi-spear fish hook having at least a pair of oppositely disposed facing spears on a wire form, the spears overlying elements of the form which are adapted to be inserted into a lure or bait, the wire form including a line attaching portion spaced from the elements remote from the spears and having a slip-ring slidably carried thereon for receiving the line.

It is a yet further object of the present invention to provide a combination of a lure and a fish hook, the hook having at least a pair of oppositely disposed facing spears on a wire form and overlying the lure, the wire form including a line attaching portion spaced from the lure remote from the spears and having a slip-ring slidably carried thereon for receiving the line.

Accordingly, the present invention provides a hook having at least a pair of spears attached to a wire body member, the body member including lure or bait attaching elements receivable within a lure and having a line attaching portion, the line or bait attaching elements being intermediate the spears and the line attaching portion. The spears are disposed in spaced facing relationship relative to each other and in spaced overlapping relationship relative to the lure or bait attaching elements. The line attaching portion includes a slip-ring slidable thereon to which the fishing line may be secured. Thus, when a fish strikes the lure and the line is pulled to set the hook, the ring may slide so that one or the other of the spears will set into the fish.

In the preferred form of the invention the hook is a wire having spears at each end and bent into a form such that the spears at the opposite ends face toward each other and overlap the lure or bait attaching elements, the latter being formed by bending the wire beneath the spears and back upon itself with the second bend extending toward and forming the line attaching portion. One of the lure or bait attaching elements may be disposed within one end, such as the mouth, of the lure or bait and the other of the elements is disposed within an opposite end, such as the butt of the lure or bait. The hook may have a plurality of spears at each end in which case the additional spears may be joined by fusing the spears to the wire. In another form of the invention the hook may be formed from separate wire elements such that the line attaching portion or the spear carrying portion may be fused to the remaining portion including the lure or bait attaching elements. In any case the lure may be included with the hook proper.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
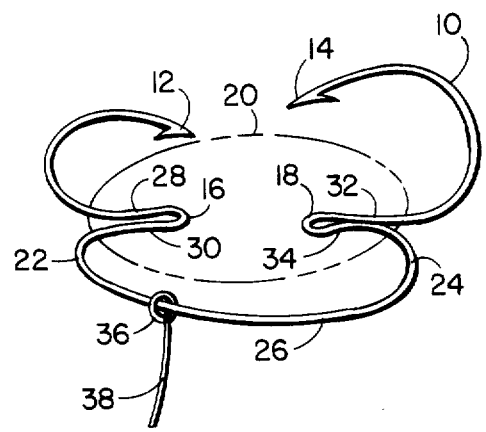
FIG. 1 illustrates a side elevational view of one form of a hook constructed in accordance with the principles of the present invention and illustrating a lure in phantom.

Referring to the drawings, and in particular to FIG. 1, a hook constructed in accordance with the invention comprises a wire member 10 having a respective spear or barb 12, 14, at each end. The wire 10 is bent into a form such that each spear 12, 14 is spaced from the other and the wire first flares outwardly in a substantially arcuate manner and then back inwardly spaced from the respective spear 12, 14 so as to form a substantially U-shaped structure extending from each spear 12 and 14 to a respective prong 16, 18. The spacing between the spears 12, 14 and the respective prongs 16, 18 are such that when the prongs 16 and 18 are inserted into a central portion of a lure 20 or live bait, the spears will be spaced from the adjacent exterior surface thereof, i.e., the upper surface in FIG. 1. From the respective prongs 16, 18, the wire is bent back upon itself and extends in an uninterrupted manner from one prong to the other, the wire first extending outwardly to respective points 22, 24 and thence in a substantially arcuate manner to form a line attaching portion 26 between these points away from the spears so as to be spaced from adjacent exterior surfaces of the lure remote from the spears. The parts of the wire that are bent back upon itself to form each prong 16, 18 may or may not abut. For example, the leg 28 may or may not abut the limb 30, and similarly the leg 32 may or may not abut the limb 34.

Disposed about the line attaching portion 26 is a ring 36 which is of a size so as to slip or slide along the portion 26. A fish line 38 may then be fastened to the ring 36. Thus, when a fish strikes the lure 20 a pull on the line 38 permits the ring 36 to slide so that the hook and lure will pivot about the ring and one or the other of the spears will engage and be set into the fish. If a fish strikes one of the spears and thrashes about, the ring permits the hook and lure to swing so that either the fish will set itself on the stricken spear or be set on the other spear, or on both.

Figure 2:
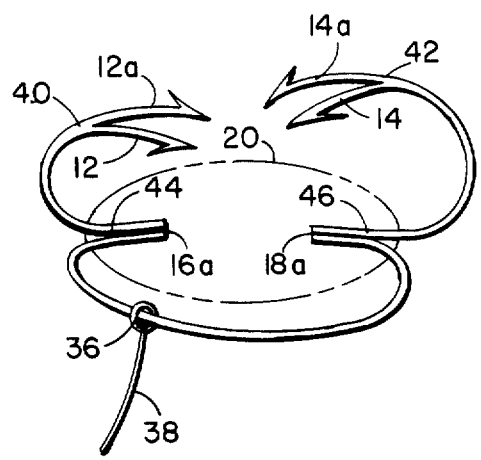
FIG. 2 is a side elevation of another hook constructed in accordance with another form of the invention.

As illustrated in FIG. 1, the hook preferably is a single wire having a spear at each end. However, it may be desirable that there be a greater number of spears on each end. This may be readily provided by brazing, welding or otherwise fusing or bonding additional spears to the wire which, as illustrated in FIG. 2, should be spaced from the end of the spears so as to extend from points such as 40, 42. Thus, the hook may have two spears 12, 12a and 14, 14a, as illustrated, or any number as may be desirable to provide a greater probability of securely spearing the fish—especially a large size fish. The spacing between the oppositely facing spears 12, 14 or 12a, 14a etc. will depend on the size of the fish being sought. Moreover, rather than constructing the hook from a single wire between the points 40, 42, the hook may be constructed from two or more parts attached as would the additional spears such that a single wire extends from points of attachment 44, 46 to prongs 16a, 18a. In operation the hook illustrated in FIG. 2 would function in the exact manner as the hook illustrated in FIG. 1.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention what is claimed herein is:

1. A fish hook comprising a wire form having at least one spear at each end thereof, said wire form having a bend extending from each spear such that spears at one end are spaced from and directed towards spears at the other end, each bend flaring away from the respective end and continuing toward a prong spaced from the respective end to form a substantially U-shaped configuration from the prong to the respective end, said prongs being sharp protuberance means spaced apart to be received within a lure or the like, said wire form further having a line attaching portion comprising an additional bend in said wire form connecting said prongs and extending adjacent each prong and then flaring away from the prongs, the spacing between said line receiving portion and said prongs being closer than the spacing between said line receiving portion and said ends.

2. A fish hook as recited in claim 1, wherein a slip-ring is slidably disposed on said line attaching portion for fastenably receiving a line.

3. A fish hook as recited in claim 1, wherein said wire form comprises a continuous elongated wire and each prong comprises limbs of the wire bent back on itself.

4. A fish hook as recited in claim 3, wherein a slip-ring is slidably disposed on said line attaching portion for fastenably receiving a line.

5. A fish hook as recited in claim 1, wherein each of said spears and the corresponding prong comprises a continuous wire, and said line attaching portion is fused to said continuous wire at each prong.

6. A fish hook as recited in claim 1, wherein said prongs and said line attaching portion comprise a continuous wire, and said spears and the bend extending therefrom are formed from other wires fused to a respective prong.

7. A fish hook comprising an elongated wire bent into a form having a pair of oppositely directed ends spaced from and pointing substantially toward each other, at least one barb on each end, said form including a substantially U-shaped portion having a first leg terminating in each end and a second leg spaced therefrom, the ends of each second leg being bent back to form a respective limb extending adjacent the respective second leg remote from the first leg, the limbs being connected together by a line attaching portion bent from said limbs and spaced from said second legs, the spacing between said line receiving portion and said second legs being closer than the spacing between said line receiving portion and said first legs.

8. A fish hook as recited in claim 7, wherein a slip-ring is slidably disposed on said line attaching portion for fastenably receiving a line.

9. A fish hook as recited in claim 7, wherein each second leg and the corresponding limb is spaced from the other second leg and corresponding limb for receiving a body of a lure or the like therebetween.

10. A fish hook as recited in claim 9, wherein a slip-ring is slidably disposed on said line attaching portion for fastenably receiving a line.

11. The combinatioon of a fish hook and a lure, said lure comprising a body member, said hook comprising a wire form having a pair of oppositely directed ends spaced from and overlying said body member, each end being spaced from and pointing substantially toward the other end, at least one spear on each end, said form including a substantially U-shaped portion extending from each end and terminating in a leg within said body member, said wire form further having a line attaching portion extending between each said leg and spaced from said body member, said body member being intermediate said ends and said line attaching portion.

12. The combination as recited in claim 11, wherein a slip-ring is slidably disposed on said line attaching portion for fastenably receiving a line.

13. The combination as recited in claim 11, wherein said hook comprises a continuous elongated wire.

14. The combination as recited in claim 13, wherein a slip-ring is slidably disposed on said line attaching portion for fastenably receiving a line.

15. The combination as recited in claim 11, wherein each end has a plurality of spears.

16. The combination as recited in claim 11, wherein each of said spears and the respective leg comprise a continuous wire, and said line attaching portion is fused thereto.

17. The combination as recited in claim 11, wherein said leg and said line attaching portion comprise a continuous wire, and said spears are formed from other wires fused to a respective leg.

* * * * *